United States Patent Office
3,539,541
Patented Nov. 10, 1970

3,539,541
PREPARATION OF COPOLYMERS CONTAINING ETHYLENE AND PROPYLENE
Richard J. Sonnenfeld, Bartlesville, Okla., assignor to Phillips Petroleum Company, a corporation of Delaware
No Drawing. Filed Sept. 13, 1967, Ser. No. 667,347
Int. Cl. C08f 15/40
U.S. Cl. 260—80.78        9 Claims

ABSTRACT OF THE DISCLOSURE

In the slurry type polymerization of a mixture of monomers comprising ethylene and propylene with an organoaluminum halide and vanadium tetrachloride catalyst system, the slurry is stabilized by carrying out the polymerization in the presence of a trihydrocarbylaluminum catalyst adjuvant.

---

This invention relates to a process for preparing copolymers of ethylene and propylene. In one aspect, it relates to a slurry type process for copolymerizing a mixture of ethylene and propylene. In another aspect, it relates to a process of copolymerizing ethylene and propylene with a third monomer.

It is known that copolymers of monoolefins, such as ethylene and propylene, can be prepared with organometallic type catalyst systems. The polymers obtained can range frome low molecular weight oils to high molecular weight solids. Copolymers of ethylene and propylene can be conveniently produced in slurry type polymerization systems wherein the polymer product is suspended in the liquid reaction medium. In commercial operations, unreacted liquid proplylene is usually employed as the diluent or reaction medium. However, when it is attempted to copolymerize ethylene and propylene in such slurry type processes, under usual conditions, there is a tendency for the polymers to agglomerate, thereby making it very difficult to agitate the reactor contents. The tendency of the polymer particles to agglomerate can be alleviated to some extent by carrying out the polymerization at extremely low temperatures.

It is an object of this invention to provide an improved slurry type process for copolymerizing mixtures of ethylene and proplene.

Another object of this invention is to provide an improved process for copolymerizing ethylene and propylene with a third monomer in a slurry type process.

A further object of this invention is to provide an improved slurry type process for copolymerizing ethylene and propylene in which the tendency of the polymer particles to agglomerate is eliminated or substantially reduced.

A further object of this invention is to improve the productivity of organoiluminum halide and vanadium tetrachloride cataylst systems for producing copolymers of ethylene and propylene.

Other aspects, advantages, and objects of this invention will be apparent to those skilled in the art upon considering the accompanying specification and claims.

The present invention is concerned with a process for polymerizing a mixture of olefins containing ethylene and propylene under conditions such that high productivity of the copolymer products is obtained while maintaining the said products in slurry form in the unreacted monomers, which serve as the reaction medium. Broadly speaking, the invention is concerned with a process wherein thylene and propylene are copolymerized in the presence of a trihydrocarbylaluminum compound, with a catalyst formed on mixing an organoaluminum halide and vanadium tetrachloride. The polymerization is carried out in the absence of an additional diluent or solvent at a temperature below about 0° C.

I have discovered that when a polymerization of ethylene and propylene is conducted in a slurry type polymerization process with an organoaluminum halide and vanadium tetrachloride catalyst system, the agglomeration of the polymer particles that are obtained can be eliminated or substantially reduced by adding the trihydrocarbylaluminum compound to the polymerization reactor containing the catalyst and monomers and thereafter carrying out the polymerization. By reducing the tendency of the copolymer particles to agglomerate, the contact of the polymerization catalyst with the monomers is improved, resulting in improved polymer productivity.

The trihydrocarbylaluminum compounds that are utilized as catalyst adjuvants in this invention can be represented by the formula $R_3Al$ where R is a saturated aliphatic, saturated cycloaliphatic, or aromatic radical, or combinations thereof, containing from 1 to 20 carbon atoms. The R groups can be the same or different in the $R_3Al$ compounds. Examples of organoaluminum compounds employed as adjuvants in my invention include trimethylaluminum, triethylaluminum, triisobutylaluminum, tri-tert-hexylaluminum, tri-n-decylaluminum, tri-n-eicosylaluminum, methyldiisopropylaluminum, tricyclohexylaluminum, triphenylaluminum, tribenzylaluminum, tri-4-tolylaluminum, diethylphenylaluminum, ethyldibutylaluminum, and the like.

Organoaluminum halides employed in the catalyst systems can be represented by the formula $R'_yAlX_z$ where R' is the same as hereinbefore defined for R, X is a halogen, particularly chlorine, bromine, or iodine, y and z are integers from 1 to 2, and $y+z$ equals 3. Mixtures of the organoaluminum halides, or organoaluminum sesquihalides, are also included. Illustrative of the organoaluminum halides that can be employed are the following: ethylaluminum sesquichloride, ethylaluminum sesquibromide, ethylaluminum dichloride, diethylaluminum chloride, isobutylaluminum diiodide, di-n-propylaluminum bromide, di-n-heptylaluminum chloride, tert-nonylaluminum dibromide, n-dodecylaluminum diiodide, cyclohexylaluminum dichloride, diphenylaluminum chloride, dibenzylaluminum bromide, 4-ethylphenylaluminum diiodide, methyl-n-eicosylaluminum chloride, and the like. Of the organoaluminum halides which are applicable, the organoaluminum chlorides are preferred.

The mol ratio of the catalyst components, i.e., the organoaluminum halide to the vanadium tetrachloride, can vary over a wide range. It will generally be in the range of 0.5:1 to 20:1. The amount of catalyst charged will generally be in the range of 0.1 to 10 gram millimoles of vanadium tetrachloride per 100 grams of propylene charged to the polymerization system.

The trihydrocarbylaluminum adjuvant that is used in my invention is charged to the polymerization system after the monomer and catalyst components have been charged thereto. The beneficial result, i.e. the elimination of polymer agglomeration at high polymer productivity, is not obtained when the trihydrocarbylaluminum adjuvant is introduced into the polymerization reactor containing the monomers prior to either or both of the catalyst components. In fact, there is a reduction in the productivity when the trihydrocarbylaluminum adjuvant is added to the polymerization reactor containing the monomers prior to either of the catalyst components.

The amount of trihydrocarbylaluminum adjuvant that is used in the process of my invention is based on the liquid reaction medium for the slurry polymerization process. In the ethylene-propylene copolymerization, liquid propylene is regarded as the reaction medium. The quantity of the trihydrocarbylaluminum catalyst adjuvant is usually in the range of about 0.2 to 5 gram millimoles per 100 grams of propylene charged to the polymerization system.

The catalyst components, i.e. the organoaluminum halide and vanadium tetrachloride, can be mixed prior charging them to the polymerization system to form the polymerization catalyst. The catalyst can also be prepared in situ in the polymerization zone by merely charging the various catalyst components to the polymerization zone. However, care must be taken to charge both catalyst components and the polymerizable monomers to the polymerization zone prior to the introduction of the trihydrocarbylaluminum catalyst adjuvant of my invention.

My improved slurry polymerization process is conducted at a temperature below about 0° C. Generally, the polymerization will be carried out in the range of from about −70 to about 0° C. In some instances it may be desirable to carry out the polymerization process at a lower temperature. When the polymerization process is carried out below about 0° C., the copolymer product separates from the solution in the form of small particles to form a slurry. The copolymer product particles remain suspended in the form of a slurry and agglomeration is not a serious problem when operating according to the process of my invention. The presence of the trihydrocarbylaluminum compound adjuvant stabilizes the slurry and makes it possible to operate this polymerization process at temperatures up to about 0° C. This represents a substantial increase in the polymerization temperature over the prior art processes without agglomeration of the copolymer product particles in the slurry.

The polymerization process of my invention is carried out at a pressure such that at least one of the monomers is in the liquid phase and serves as the reaction medium. As a result of operating in this manner it is not necessary to utilize an extraneous hydrocarbon diluent.

The present invention is also applicable to the preparation of terpolymers of ethylene and propylene with a third monomer. The third monomer introduces unsaturation into the polymer chain and renders the product sulfur vulcanizable. Examples of suitable termonomers include dicyclopentadiene; ethynyl ethylenes, such as vinylacetylene, isopropenylacetylene, and 2-ethyl-1-buten-3-yne; certain of the fulvene class of compounds, such as fulvene itself, 6,6-dimethylfulvene and 6,6-diethylfulvene; acrylic nonconjugated dienes, such as 1,4-pentadiene, 1,5-hexadiene, 2-methyl-1,5-hexadiene, 1,7-octadiene, and the like; nornorbornene, ethylidene norbornenes such as methylene norbornene, ethylidene norbornene, propylidene norbornene, and methyl methylene norbornene; and the like. When a termonomer is employed, it will generally make up from 0.5 to 20, preferably 1 to 10, weight percent of the polymer.

The polymerization process of my invention can also be conducted in the presence of certain conjugated dienes which aid in stabilization of the polymer slurry to some extent. These conjugated dienes are usually incorporated into the final copolymer product only in trace amounts. These compounds include 1,3-butadiene, isoprene, chloroprene, and the like. When the conjugated dienes are used in the polymerization process, they will generally be present in the range of about 5 to 100 gram millimoles of conjugated diene per 100 grams of propylene in the polymerization system.

The process of this invention can be carried out as a batch process. The process can also be carried out continuously by maintaining the above-described concentration of reactants in the reaction zone for a suitable residence time. The residence time in a continuous process will vary over rather wide limits, depending on such variables as temperature, the ratio of catalyst components, and the catalyst concentration.

The polymerization process of this invention is conducted in the absence of materials which may have a deleterious effect on the catalyst activity. Such materials include oxygen, carbon dioxide and water. Any known means for removing such contaminants can be employed.

Upon completion of the polymerization reaction, the entire reaction mixture can be treated to inactivate the catalyst. One suitable method for inactivating the catalyst is by the addition of alcohol. The alcohol will inactivate the catalyst and the polymer particles can then be separated from the reaction mixture by filtration, decantation, and the like. After the polymerization process is completed, various antioxidants can be added to the polymer.

In another preferred method of operation, the polymer particles can be recovered from the reaction mixture at the completion of the polymerization reaction prior to catalyst inactivation. The removal can be made by any method known in the art, such as by filtering, centrifuging or decanting off the liquid phase of the slurry. The recovered polymer particles can then be treated to inactivate and remove catalyst residues. The withdrawn uncontaminated liquid phase, which comprises unreacted monomers, dissolved active catalyst components and the like, can be recycled to the polymerization zone for further reaction. This type of operation eliminates the requirement of having to purify the recovered unreacted monomers before they are recycled to the polymerization, as is necessary when the entire reaction mixture is treated to inactivate and remove the catalyst. This type of operation also results in reduced requirements for polymerization catalysts since dissolved catalyst components in the liquid phase of the slurry are returned to the polymerization zone instead of being totally inactivated when the entire reaction mixture is treated to inactivate the catalyst.

The vulcanization or curing of the polymers produced in accordance with my invention can be carried out accorring to conventional vulcanization procedures. The copolymers of ethylene and propylene can be cured with compounds which decompose to form free radicals such as peroxides and the like. The terpolymers, which contain some unsaturation, can be sulfur cured by conventional vulcanization processes.

A more comprehensive understanding of my invention can be obtained by referring to the following illustrative examples, which are not intended to unduly limit the scope of the invention.

EXAMPLE

Runs were made to demonstrate the effectiveness of trihydrocarbylaluminum compounds as slurry stabilizers when copolymerizing ethylene with propylene and also to demonstrate the importance of time of charging of the materials employed as slurry stabilizers. Runs were conducted in a 2-liter resin flask in the presence of a catalyst formed on mixing ethylaluminum sesquichloride with vanadium tetrachloride. The diluent was liquid propylene. Dicyclopentadiene was employed as a termonomer to introduce unsaturation into the polymer molecule. In all of the runs 750 milliliters of liquid propylene (about 450 grams) was charged to a reactor that had been cooled by passing dry nitrogen through it. Dicyclopentadiene (100 millimoles) was added followed by the ethylaluminum sesquichloride. In all runs except one, ethylene was then introduced over a 15-minute period at a rate of 1500 milliliters per minute to saturate the propylene. In one run triethylaluminum was added prior to the ethylene. Vanadium tetrachloride was charged next and then the slurry stabilizer, when used, except in the run in which the stabilizer was added prior to the ethylene.

Reactions were shortstopped with a 10 weight percent solution of 2,2′ - methylene-bis(4 - methyl -6 -tert-butylphenol) in isopropyl alcohol, the amount used being sufficient to provide one part by weight of the antioxidant per 100 parts of the rubbery polymer. The propylene was separated from each polymer slurry. The polymer was dissolved in toluene, coagulated in isopropyl alcohol, separated, and dried. Data are presented in Table I.

TABLE I

| Run No. | 1 | 2 | 3 | 4 | 5 | 6 | 7 | 8 | 9 | 10 | 11 |
|---|---|---|---|---|---|---|---|---|---|---|---|
| EASC, mmols | 2.7 | 2.0 | 2.0 | 2.0 | 1.0 | 2.0 | 2.0 | 2.0 | 2.0 | 2.0 | 2.0 |
| VCl$_4$, mmols | 2.0 | 2.0 | 2.0 | 1.0 | 1.0 | 2.0 | 2.0 | 2.0 | 2.0 | [1] 2.0 | 2.0 |
| TEA, mmols | 2.5 | 2.0 | 1.0 | 2.5 | 2.5 | | | | | 2.5 | |
| TBA, mmols | | | | | | 2.5 | | | | | |
| DEAC, mmols | | | | | | | 2.5 | | | | |
| EASC, mmols | | | | | | | | [2] 2.5 | | | |
| EADC, mmols | | | | | | | | | 2.5 | | |
| Temperature, °C | −57 to −45 | −55 to −47 | −58 to −53 | −55 to −49 | −55 to −48 | −55 to −48 | −55 | −55 | −55 | −56 | −55 |
| Polymerization time, min | 6 | 10 | 10 | 10 | 10 | 15 | 10 | 10 | 10 | 10 | 20 |
| Polymer wt., grams | 31.4 | 30.5 | 16.9 | 23.5 | 25.8 | 32.5 | 7.0 | 7.7 | 1.9 | 2.9 | 6.3 |
| Propylene, wt. percent | 49 | 53 | 47 | 44 | 43 | 58 | 42 | ($^5$) | ($^5$) | ($^5$) | 43 |
| Inherent viscosity $^3$ | 1.05 | 1.02 | 1.18 | 1.27 | 1.44 | 1.18 | 3.23 | ($^5$) | ($^5$) | ($^5$) | 2.9 |
| Unsaturation,$^4$ mmols ICl/g. polymer | 0.57 | 9.44 | 0.36 | 0.38 | 0.37 | 0.38 | 0.16 | ($^5$) | ($^5$) | ($^5$) | 0.29 |

$^1$ Triethylaluminum was charged prior to the ethylene; VCl$_4$ was charged last.
$^2$ This portion charged following the VCl$_4$.
$^3$ Determined by the procedure shown in U.S. Pat. No. 3,078,254.
$^4$ Determined by ICl titration using the following procedure: A 0.5 gram sample of polymer was dissolved in a 75/25 volume mixture of carbon disulfide and chloroform. A chloroform mixture of iodine chloride of known concentration (approximately 0.09–0.10 molar) was added and the mixture was placed in a 25° C. bath for one hour to allow time for reaction. The excess iodine chloride was titrated with 0.05 N sodium thiosulfate. The millimoles of iodine chloride that reacted with the sample of polymer was calculated. A blank was run using only solvent and iodine chloride and the appropriate correction was made when calculating Insaturation.
$^5$ Not determined.

NOTE.—moles=millimoles; EASC=ethylaluminum sesquichloride; TEA=triethylaluminum; TBA=triisobutylaluminum; DEAC=diethylaluminum chloride; EADC=ethylaluminum dichloride.

Runs 1 through 6 were made according to the invention. In these runs the polymers were still in slurry form when the reactions were terminated and the productivity was much higher than in runs 7 through 11. An increase in the amount of slurry stabilizer gave an increase in productivity as can be seen by comparing runs 1, 2, and 3. An organoaluminum halide was used in place of triethylaluminum or triisobutylaluminum in runs 7, 8, and 9. In run 7, most of the polymer was in slurry form after 10 minutes but productivity was low. In run 8, the polymer was not maintained in the slurry and stuck to purge tube, thermometer, and stirring blade in the reactor. In run 9 the polymer was in a fine slurry after 10 minutes, but productivity was low. A comparison of results of runs 7 and 8 with that of run 11 in which no slurry stabilizer was present, shows that very low productivity and little, if any, stabilization was obtained. Run 10 demonstrates the importance of charge order for the slurry stabilizer. Productivity dropped to a low level when the triethylaluminum was charged prior to the vanadium tetrachloride. A small amount of polymer was in suspension when the reaction was terminated in run 10 but productivity was very low.

It will be apparent to those skilled in the are that many variations and modifications can be made upon consideration of the foregoing disclosure. Reasonable variations and modifications can be made in the foregoing disclosure without departing from the spirit and scope of the invention.

I claim:

1. In a process for copolymerizing a mixture of monomers comprising ethylene and propylene in a slurry type polymerization system wherein at least one of said monomers serves as the slurry medium and utilizing a polymerization catalyst which forms on mixing an organoaluminum halide compound and vanadium tetrachloride, the improvement which comprises adding said monomers and said catalyst to said polymerization system, thereafter adding a trihydrocarbylaluminum compound having the formula R$_3$Al where R is a saturated aliphatic, saturated cycloaliphatic or aromatic radical containing from 1 to 20 carbon atoms, and carrying out the polymerization at a temperature in the range from about −70 to 0° C., and wherein said trihydrocarbylaluminum compound is employed in an amount to provide from about 0.2 to 5 gram millimoles per 100 grams of propylene charged to the polymerization system.

2. The process of claim 1 wherein the mol ratio of organoaluminum halide to vanadium tetrachloride is from about 0.5:1 to 20:1; the amount of catalyst present being in the range of about 0.1 to 10 gram millimoles of vanadium tetrachloride per 100 grams of total 1-monoolefins charged to the system.

3. The process of claim 2 wherein said organoaluminum compound is triethylaluminum.

4. The process of claim 2 wherein said organoaluminum halide is ethylaluminum sesquichloride.

5. The process of claim 2 wherein said organoaluminum halide is ethylaluminum sesquichloride.

6. The process of claim 2 wherein said mixture of monomers includes a termonomer to introduce unsaturation into the polymer product.

7. The process of claim 6 wherein said organoaluminum halide is ethylaluminum sesquichloride.

8. The process of claim 7 wherein said organoaluminum compound is triethylaluminum.

9. The process of claim 7 wherein said organoaluminum compound is triisobutylaluminum.

References Cited

UNITED STATES PATENTS 3,058,963   10/1962   Vandenberg _____ 260—88.2

JOSEPH L. SCHOFER, Primary Examiner

R. S. BENJAMIN, Assistant Examiner

U.S. Cl. X.R.

260—88.2

UNITED STATES PATENT OFFICE
CERTIFICATE OF CORRECTION

Patent No. 3,539,541      Dated November 10, 1970

Inventor(s) Richard J. Sonnenfeld

It is certified that error appears in the above-identified patent and that said Letters Patent are hereby corrected as shown below:

Column 6, line 39, "halide is ethylaluminum sesquichlor should read -- compound is triisobutylaluminum --.

Signed and sealed this 23rd day of March 1971.

(SEAL)
Attest:

EDWARD M. FLETCHER, JR.
Attesting Officer

WILLIAM E. SCHUYLER, JR
Commissioner of Patents